United States Patent Office 2,915,521
Patented Dec. 1, 1959

2,915,521

QUINAZOLONE DERIVATIVES

Gerald D. Laubach, Jackson Heights, and William M. McLamore, Kew Gardens, N.Y., assignors to Chas. Pfizer & Co., Inc., Brooklyn, N.Y., a corporation of Delaware No Drawing. Application May 14, 1957
Serial No. 658,946

6 Claims. (Cl. 260—251)

This application is concerned with new and useful therapeutic agents. More particularly, it is concerned with certain quinazolones found to be useful as regulators of the central nervous system, being especially useful as hypnotic agents.

The compounds of the instant invention are 2-methyl-3 - (4' - chloro - 2' - methylphenyl) - 4(3H) - quinazolone, 2 - methyl - 3 - (4' - bromo - 2' - methylphenyl)-4(3H)-quinazolone and their pharmaceutically acceptable acid addition salts. These compounds can be prepared by the reaction between acetylanthranil and 4-chloro-2-methylaniline or 4-bromo-2-methylaniline.

The acetylanthranil used in the prepartion of the compounds of the present invention can be prepared by the action of acetic anhydride with anthranilic acid as described by Bogert in the Journal of The American Chemical Society, volume 30, page 108. The anilines which are required are available commercially or can be readily prepared by methods well known in the art.

For the preparation of the valuable therapeutic agents of this invention, the acetylanthranil is contacted with the selected aniline in an inert organic solvent in the presence of a dehydrating agent. It is preferred to use equimolar quantities of the acetylanthranil and the aniline to decrease the possibility of side reactions.

Suitable organic solvents for this synthesis include aliphatic and aromatic hydrocarbon solvents and their halogenated analogs. These include heptane, cyclohexane, carbon tetrachloride, carbon tetrabromide, benzene, toluene, the xylenes, chlorobenzene, bromobenzene and other equivalents. It is most practical to select a solvent whose boiling point at atmospheric conditions is within the preferred temperature range for carrying out the reaction, and to reflux the reaction mixture.

The temperature at which the reaction is carried out is not critical but the temperature should be selected so as to permit completion of the reaction within a reasonable time without undue expenditure of heat energy. Thus, while some reaction does take place at room temperature, the time for completion of the reaction is inordinately long. Temperatures from about 75° C. to about 160° C. have been found to be practical, while in some instances suitable yields are obtained at from about 100 to about 115° C.

The most suitable dehydrating agent for the synthesis is phosphorus trichloride, although other dehydrating agents such as phosphorus oxychloride or polyphosphoric acid can be used. Equimolar quantities or even an excess of dehydrating agent can be used, but there is no advantage in so doing since as little as thirty mole percent or even less of the dehydrating agent produces satisfactory yields.

It has been found that the best yields are obtained if the reaction mixture containing the aniline and the acetylanthranil in the inert organic solvent is preheated for up to two hours at from about 75° C. to about 100° C. prior to the addition of the dehydrating agent. This action is not obsolutely necessary. Thus, a mixture of the aniline, acetylanthranil and the dehydrating agent may be heated for from one to about six hours without the necessity of preheating to obtain suitable yields.

The product obtained by carrying out the above described reaction is a mixture of the free base and the acid addition salt of the free base which is formed by reaction of the free base with acids formed by decomposition of the dehydrating agent. Thus, if phosphorus trichloride is used the mixture will contain a therapeutically active free base, the hydrochloride of this free base and the phosphoric acid addition salt of this free base, the latter two products being formed by reaction of the free base with hydrochloric acid and with phosphoric acid formed by reaction of water with phosphorus trichloride. The mixture can be purified and the product isolated by a number of procedures known to those skilled in the art. Two methods have been found to be especially useful for the isolation of a product of high purity.

In one of these methods the mixture is made basic with an aqueous solution of an alkali metal or an alkaline earth metal carbonate, bicarbonate, oxide or hydroxide, extracted with an organic solvent and precipitated from said organic solvent as the hydrochloride by the addition of anhydrous hydrogen chloride. Suitable solvents for this purification include lower aliphatic and aromatic oxygenated hydrocarbon solvents, particularly those of low polarity such as ether, dioxane, chloroform, etc. The hydrochloride can then be purified by recrystallization from any suitable solvent. The lower oxygenated polar organic solvents such as the lower alkanols are useful. Methanol and ethanol are particularly advantageous. The free base can be regenerated from the purified acid addition salt by treatment with an aqueous basic reagent of the same nature of those described above. It is extracted from aqueous solution with the same type of organic solvent described above and may be isolated from the organic solvent by the usual means employed for this purpose such as evaporation of the solvent in vacuo.

In the second of the two methods the reaction mixture is treated with an aqueous basic solution of an alkali metal or alkaline earth metal carbonate, bicarbonate, oxide or hydroxide, and extracted with an organic solvent such as the lower aliphatic and aromatic oxygenated hydrocarbon and halogenated hydrocarbon solvents described above. The free base is isolated from the organic solution by precipitation with a less polar organic solvent, for example, a lower aliphatic hydrocarbon solvent such as the petroleum ethers, hexane, octane, etc. Alternatively, it can be isolated by evaporation of the solvent in vacuo.

It is apparent that the process of this invention can be applied to the preparation of other quinazolones. By choice of an acylanthranil other than acetylanthranil it can be applied to the preparation of quinazolones with substituents other than methyl at the 2-position, by suitable choice of the aniline derivative it can be applied to the preparation of compounds with other than 4-chloro-2-methyl or 4-bromo-2-methyl substituents on the phenyl ring. The process can be applied, for example, to the preparation of 2-methyl-3-(2'-chloro-4'-methylphenyl)-4(3H)-quinazolone; 2-methyl-3-(2'-bromo-4'-methylphenyl)-4(3H)-quinazolone; 2-methyl-3-(4'-iodo-2'-methylphenyl)-4(3H)-quinazolone; 2-methyl-3-(4'-fluoro-2'-methylphenyl)-4(3H)-quinazolone; 2-methyl-3-(2',4'-dichlorophenyl)-4(3H)-quinazolone; 2-methyl-3-(2'-methylphenyl)-4(3H)-quinazolone; 2-ethyl-3-(4'-chloro-2'-methylphenyl)-4(3H)-quinazolone; 2-propyl-3-(2'-chlorophenyl)-4(3H)-quinazolone and others.

As stated above, the compounds of this invention are useful as regulators of the central nervous system and are especially useful as hypnotic agents. The utility of a particular medicinal agent as a hypnotic compound is generally expressed in terms of its $HD_{50}$. The $HD_{50}$ may be defined as the median hypnotic dose or that dose which will cause sleep in 50% of the animals tested. It can be determined according to the well known method of Litchfield and Wilcoxon as described in the Journal of Pharmacology and Experimental Therapeutics, volume 96, page 99.

The $HD_{50}$ of both 2-methyl-3-(4'-chloro-2'-methylphenyl)-4(3H)-quinazolone and of the bromo analog when tested in mice is only 36 mg./kg. of body weight. The $HD_{50}$ of the acid addition salts is, of course, somewhat higher depending upon the molecular weight of the acid which forms the acid addition salt.

The compounds of this invention have likewise been found to be effective hypnotic agents for higher animals including cats, dogs and monkeys. In one test designed to determine the hypnotic activity of 2-methyl-3-(4'-chloro-2'-methylphenyl)-4(3H)-quinazolone, a dog was treated orally with a dosage unit of 25 mg./kg. of body weight. It was found that the dog had entered a hypnotic state as measured by the loss of righting reflex twenty-six minutes after the administration. The duration of the hypnotic effect was more than 265 minutes. Similar results are obtained with the bromo compound and with the acid addition salts of these compounds.

In another test using monkeys, a monkey was treated orally with 10 mg./kg. of body weight of 2-methyl-3-(4'-chloro-2'-methylphenyl)-4(3H)-quinazolone and the animal lost its righting reflex after fifteen minutes and remained in an hypnotic state for sixty minutes.

The compounds of this invention have other advantages besides their high order of activity. They have a very high therapeutic index. The therapeutic index of a medicinal agent is a measure of its safety. It is a ratio of the $LD_{50}$ of a compound to its $HD_{50}$. When this ratio is high the compound has a high therapeutic index and can, therefore, be used with a high degree of confidence in its safety. The $LD_{50}$ is a measure of the lethal capacity of a compound and may be defined as the median lethal dose or that dose which will kill 50% of the animals under test. The $LD_{50}$ of 2-methyl-3-(4'-chloro-2'-methylphenyl)-4(3H)-quinazolone as measured in mice is 358. The $HD_{50}$ as stated above, is only 36. Its therapeutic index, therefore, is practically 10. It should be noted that the therapeutic index of phenobarbital sodium when administered subcutaneously to mice is 2.3 and when administered orally is 2.1. The therapeutic indices of pentobarbital sodium when similarly administered to mice are 3.3 and 2.2 respectively.

As a further measure of the low toxicity of the compounds of this invention, it should be mentioned that in dogs dosage levels of 2-methyl-(4'-chloro-2'-methylphenyl)-4(3H)-quinazolone as high as 200 mg./kg. of body weight, and in monkeys, dosage levels as high as 400 mg./kg. of body weight were administered with no fatalities. Similar results were obtained with the bromo analog and with acid addition salts. When pentobarbital sodium was administered to monkeys at these levels, all of the animals died; and when phenobarbital sodium was likewise administered to monkeys, 50% of the animals died.

The agents of this invention may be administered alone but are generally administered with a pharmaceutical carrier selected on the basis of the chosen route of administration and standard pharmaceutical practice. For example, they may be administered orally in the form of tablets or capsules containing such excipients as starch or milk sugar or certain types of clay, etc. They may be administered orally in the form of elixirs or oral suspensions which may contain coloring or flavoring agents. They may be injected parenterally and for this use may be prepared in the form of sterile aqueous solutions containing other solutes such as saline or glucose in sufficient quantity to make the solution isotonic. For intramuscular administration compositions of the compounds of this invention may be prepared in an oil base such as peanut or sesame oil.

The physician or veterinarian will determine the dosage which will be most suitable for a particular application. It will generally be found that when a drug is administered orally a larger quantity will be required to produce the same central nervous system effect as a smaller quantity given parenterally. For the treatment of most patients, from 50 to 500 mg. per dose produces the desired hypnotic effect.

The compositions of this invention may take a variety of forms. Various diluents may be employed and the percentage of active ingredients may be varied. It is necessary that the active ingredient form a proportion of the composition such that a suitable dosage form will be obtained. Obviously several dosage unit forms may be administered at about the same time. Although compositions with less than 0.005% by weight of active ingredients are suitable, it is preferred to use compositions containing not less than 0.005% of the active agent because otherwise the amount of carrier becomes excessively large. Activity increases with the concentration of the active agent. The dosage by weight of active agent may be 10, 50, 75, 95% or even higher. Dosage unit forms may be prepared with a minor proportion of a carrier and a larger proportion of active materials and vice versa.

As stated above, it is intended to include within the purview of the instant invention various pharmaceutically acceptable acid addition salts. That is, acid addition salts which these compounds form with acids having a pharmaceutically acceptable anion. The term, "pharmaceutically acceptable anion" has a definite meaning to one skilled in the art. It is defined as a non-toxic anion of any of the simple acids commercially used therapeutically to neutralize basic medicinal agents when the salt thereof is to be administered to a human host. These acids include, for example, hydrochloric, hydrobromic, hydriodic, sulfuric, succinic, maleic, tartaric, citric, glycolic and others. The pharmaceutical activity of the molecule is primarily a function of the cation, the anion serving chiefly to supply electric neutrality. These various pharmaceutically acceptable acid addition salts can be prepared by procedures well known in the art. One highly useful method comprises contacting the acid addition salt with a basic anion exchange resin, for example, a highly basic compound such as the one available from the Rohm & Haas Company under the name Amberlite IRA-400. This resin is a polyquaternary ammonium compound which is prepared by chloromethylating a highly cross-linked copolymer of styrene and divinylbenzene followed by treatment of the chloromethylating material with a tertiary amine such as trimethylamine. To prepare an acid addition salt of this invention, for example, the citrate, the resin is first contacted with an aqueous solution of citric acid whereupon an anion exchange takes place converting the quaternary halide to the citrate. The citrate resin is then contacted with an acid addition salt, for example, the hydrochloride prepared as described above and a further anion exchange takes place converting the hydrochloride to the citrate and leaving the anion of the original salt on the resin. The citrate can be recovered from the eluate by a number of methods such as evaporation or solvent precipitation. This same procedure can be used to prepare the nitrate, acetate or other acid addition salt.

The following examples are given solely for the purpose of illustration and are not to be construed as limitations of this invention, many apparent variations of which are possible without departing from the spirit or scope thereof.

EXAMPLE I

*2-methyl-(4'-chloro-2'-methylphenyl)-4(3H)-quinazolone*

To a solution of 105.3 g. (0.65 mole) of acetylanthranil in 975 ml. of toluene was added 92.3 g. (0.65 mole) of 4-chloro-2-methylaniline. The resulting solution was refluxed for one hour, treated with 29.9 g. (0.221 mole) of phosphorus trichloride and refluxed for an additional two hours. The suspension of gummy solid was cooled and made strongly basic with 5% sodium carbonate solution followed by 10% aqueous sodium hydroxide. The organic layer was separated and the aqueous layer (including any solid) extracted with an equal volume of chloroform. The combined organic layers were filtered and concentrated to a volume of about 600 ml. This solution was treated with activated charcoal, filtered and concentrated to a volume of about 300 ml. The addition of 900 ml. of petroleum ether precipitated the crude product which was recrystallized from ether-petroleum ether using activated charcoal as a purifying agent. An analytical sample melted at 121° C. to 121.8° C. It was obtained by two recrystallizations from ether.

*Analysis.*—Calc'd. for $C_{16}H_{13}ON_2Cl$: C, 67.49; H, 4.60; N, 9.84; Cl, 12.45. Found: C, 67.14; H, 4.57; N, 9.81; Cl, 12.55.

EXAMPLE II

*2-methyl-3-(4'-bromo-2'-methylphenyl)-4(3H)-quinazolone*

To a solution of 8.1 g. (0.05 mole) of acetylanthranil in 100 mg. of toluene was added 9.3 g. (0.05 mole) of 4-bromo-2-methylaniline. The resulting solution was refluxed for one hour, treated with 2.3 g. (0.02 mole) of phosphorus trichloride and refluxed for a further two hours. The suspension was cooled and made strongly basic with 5% sodium carbonate solution followed by 10% sodium hydroxide. The organic layer was separated and the aqueous layer (including any solid) extracted with chloroform. The combined organic layers were concentrated to a volume of about 60 ml. This solution was treated with activated charcoal, filtered and concentrated to about 50 ml. The addition of about 200 ml. of petroleum ether precipitated the free base. The free base was taken up in ether and precipitated as the hydrochloride by bubbling in anhydrous hydrogen chloride. The hydrochloride was recovered by filtration and recrystallized from ethanol using activated charcoal. The recrystallized product melted at 278° C. to 280° C. The hydrochloride was taken up in 35 ml. of 10% aqueous potassium bicarbonate solution and extracted with chloroform. The chloroform solution was dried over anhydrous sodium sulfate, filtered and precipitated by the addition of petroleum ether. The free base was recovered by filtration and dried in vacuo. It melted at 134° to 135° C.

*Analysis.*—Calc'd. for $C_{16}H_{13}ON_2Br$: C, 58.37; H, 3.98; N, 8.51. Found: C, 58.15; H, 3.94; N, 8.46.

EXAMPLE III

*2-methyl-3-(4'-chloro-2'-methylphenyl)-4(3H)-quinazolone hydrochloride*

A solution of 10 g. of 2-methyl-3-(4'-chloro-2'-methylphenyl)-4(3H)-quinazolone in 50 cc. of methanol was treated with an equal volume of ethanolic hydrogen chloride to precipitate the free base as the hydrochloride. Precipitation was completed by the addition of ether. The product was recovered by filtration and air dried; M.P. 272° C. to 273° C. (*d*).

EXAMPLE IV

*2-methyl-3-(4'-chloro-2'-methylphenyl)-4(3H)-quinazolone sulfate*

A 15% aqueous solution of 2-methyl-3-(4'-chloro-2'-methylphenyl)-4(3H)-quinazolone hydrochloride was stirred for three hours with an anion exchange resin which had been previously washed with aqueous sulfuric acid. The resin was removed by filtration and the solvent removed in vacuo to leave the sulfuric acid addition salt as a residue.

Included among the anion exchange resins which were used for this process were Amberlite IRA–410, IRA–400, both available from Rohm & Haas Company, and Dowex–1 and Dowex–2 available from the Dow Chemical Company.

A number of other acid additions were prepared using this procedure including the hydrobromide, the nitrate and sulfuric acid addition salt.

EXAMPLE V

A tablet base is prepared by blending the following ingredients in the proportion by weight indicated.

Sucrose U.S.P. _____ 82.0
Tapioca starch _____ 13.6
Magnesium stearate _____ 4.4

Into this tablet base there is blended a sufficient amount of 2-methyl-3-(4'-bromo-2'-methylphenyl)-4(3H)-quinazolone to provide tablets each containing 100 mg. of active ingredient.

EXAMPLE VI

Into the tablet base of Example V there is blended a sufficient amount of 2-methyl-3-(4'-chloro-2'-methylphenyl)-4(3H)-quinazolone to provide tablets each containing 50 mg. of active ingredient.

EXAMPLE VII

A tablet base is prepared by blending the following ingredients in the proportion by weight indicated.

Sucrose U.S.P. _____ 80.3
Tapioca starch _____ 13.2
Magnesium stearate _____ 6.5

Into this tablet base there is blended a sufficient amount of 2-methyl-3-(4'-chloro-2'-methylphenyl)-4(3H)-quinazolone hydrochloride to provide tablets each containing 200 mg. of the active ingredient

EXAMPLE VIII

Into the tablet base of Example VII there is blended a sufficient amount of 2-methyl-3-(4'-bromo-2'-methylphenyl)-4(3H)-quinazolone hydrobromide to provide tablets each containing 150 mg. of active ingredient.

EXAMPLE IX

An aqueous solution containing 0.005% by weight of 2 - methyl - 3 - (4' - chloro - 2' - methylphenyl) - 4(3H)-quinazoline hydrochloride is prepared by dissolving the salt in U.S.P. distilled water.

EXAMPLE X

Sesame oil is sterilized by heating at 125° C. for two hours. To this oil there is added a sufficient quantity of pulverized 2-methyl-3-(4'-bromo-2'-methylphenyl)-4(3H)-quinazolone hydrochloride to make a 10% suspension by weight. The solid is dispersed in the oil with the aid of a colloid mill. It is then filtered through a 100 to 150 mesh screen and poured into sterile vials.

What is claimed is:

1. A compound selected from the group consisting of 2-methyl-3-(4'-chloro-2'-methylphenyl)-4(3H)-quinazolone, 2-methyl-3-(4'-bromo-2'-methylphenyl)-4(3H)- quinazolone and their pharmaceutically acceptable acid addition salts.

2. 2 - methyl - 3 - (4' - chloro - 2' - methylphenyl)-4(3H)-quinazolone.

3. 2 - methyl - 3 - (4' - bromo - 2' - methylphenyl)-4(3H)-quinazolone.

4. 2 - methyl - 3 - (4' - chloro - 2' - methylphenyl)-4(3H)-quinazolone hydrochloride.

5. 2 - methyl - 3 - (4' - bromo - 2' - methylphenyl)-4(3H)-quinazolone hydrochloride.

6. 2 - methyl - 3 - (4' - chloro - 2' - methylphenyl)-4(3H)-quinazolone hydrobromide.

References Cited in the file of this patent

UNITED STATES PATENTS 2,408,633     Guenther et al. _____ Oct. 1, 1946

OTHER REFERENCES

Chemical Abstracts, vol. 50, p. 6662 (1956).
Chemical Abstracts, vol. 49, p. 11665 (1955).